US009746630B2

(12) United States Patent
Register, III

(10) Patent No.: US 9,746,630 B2
(45) Date of Patent: Aug. 29, 2017

(54) HYBRID OPTICAL FIBER RIBBON AND POWER CABLE

(71) Applicant: Corning Optical Communications LLC, Hickory, NC (US)

(72) Inventor: James Arthur Register, III, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/995,505

(22) Filed: Jan. 14, 2016

(65) Prior Publication Data

US 2016/0209611 A1    Jul. 21, 2016

Related U.S. Application Data

(60) Provisional application No. 62/103,823, filed on Jan. 15, 2015.

(51) Int. Cl.
G02B 6/44    (2006.01)

(52) U.S. Cl.
CPC ......... *G02B 6/4416* (2013.01); *G02B 6/448* (2013.01); *G02B 6/4434* (2013.01); *G02B 6/4486* (2013.01); *G02B 6/4403* (2013.01); *G02B 6/4413* (2013.01)

(58) Field of Classification Search
CPC .... G02B 6/4416; G02B 6/4434; G02B 6/448; G02B 6/4486
USPC ....................................................... 385/101
See application file for complete search history.

(56) References Cited

U.S. PATENT DOCUMENTS

| 6,140,589 A * | 10/2000 | Blackmore | H01B 7/0009 |
| | | | 174/128.1 |
| 6,169,834 B1 | 1/2001 | Keller | |
| 6,758,600 B2 * | 7/2004 | Del Grosso | G02B 6/4471 |
| | | | 385/59 |
| 7,242,830 B2 | 7/2007 | Storaasli et al. | |
| 7,787,727 B2 * | 8/2010 | Bringuier | G02B 6/02357 |
| | | | 385/100 |
| 8,620,124 B1 * | 12/2013 | Blazer | G02B 6/4489 |
| | | | 385/102 |

(Continued)

FOREIGN PATENT DOCUMENTS

| CA | 2275518 C | 4/2009 |
| CN | 202522750 U | 11/2012 |

(Continued)

OTHER PUBLICATIONS

International Search Report and Written Opinion of the International Searching Authority; PCT/US2016/013426; Mailed Mar. 11, 2016, 11 Pages.

*Primary Examiner* — Jerry Blevins
(74) *Attorney, Agent, or Firm* — William D. Doyle

(57) ABSTRACT

A hybrid cable includes a jacket defining a cavity therein, a central strength member, a ribbon unit having a plurality of optical fibers, and a conductor cable, wherein the conductor cable and the ribbon unit are stranded around the central strength member to extend through the cavity of the jacket. A method of manufacturing a hybrid optical and power cable includes stranding at least one ribbon unit and at least one conductive power cable around a strength member and extruding a jacket around the stranded at least one ribbon unit and at least one conductive power cable.

13 Claims, 2 Drawing Sheets

(56) References Cited

U.S. PATENT DOCUMENTS

| | | |
|---|---|---|
| 8,913,862 B1 | 12/2014 | Emmerich et al. |
| 2002/0136510 A1 | 9/2002 | Heinz et al. |
| 2006/0193575 A1 | 8/2006 | Greenwood et al. |
| 2010/0290748 A1 | 11/2010 | Kojima et al. |
| 2013/0051741 A1* | 2/2013 | Register, III ......... G02B 6/4417 385/101 |
| 2013/0294735 A1* | 11/2013 | Burris .................. G02B 6/4415 385/101 |
| 2014/0064681 A1 | 3/2014 | Register, III et al. |

FOREIGN PATENT DOCUMENTS

| | | |
|---|---|---|
| CN | 202917248 U | 5/2013 |
| EP | 1219998 A3 | 6/2004 |
| JP | 2003035850 A | 2/2003 |

* cited by examiner ns shown in FIGS. 1A and 1B may be a Corning, Inc. RIC
HYBRID OPTICAL FIBER RIBBON AND POWER CABLE

CROSS-REFERENCE TO RELATED APPLICATIONS

This application claims the benefit of priority to U.S. Provisional Application No. 62/103,823, filed on Jan. 15, 2015, and is incorporated herein by reference.

BACKGROUND

Aspects of the present disclosure relate generally to hybrid cables that include both fiber-optic and electrical-conductor elements, such as for use with fiber-to-the-antenna applications.

SUMMARY

One embodiment relates to a hybrid cable. The hybrid cable includes a jacket defining a cavity therein, a central strength member, a ribbon unit having a plurality of optical fibers, and a conductive power cable, wherein the conductive power cable and the ribbon unit are stranded around the central strength member to extend through the cavity of the jacket.

In accordance with other aspects of the present disclosure, A method of manufacturing a hybrid optical and power cable includes stranding at least one ribbon unit and at least one conductive power cable around a strength member and extruding a jacket around the stranded at least one ribbon unit and at least one conductive power cable.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments in detail, it should be understood that the present inventive and innovative technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Cellular service providers may deploy Remote Radio Head (RRH) solutions throughout their antenna networks, a process that involves locating power radio frequency (RF) amplifiers at the top of the antenna (e.g., cell tower; radio tower; cell site). Remote Radio Head (RRH) solutions accordingly require cabling arrangements that deliver both power for the amplifiers and the high bandwidth capabilities of a fiber cable. Such arrangement may vary widely, but one suitable arrangement includes use of a cable that combines electrical conductors with optical fibers, known as a hybrid cable.

Aspects of the present disclosure relate to a hybrid optical fiber ribbon and power conductor cable that maintains high density for relatively low fiber count designs where a single tube ribbon may not provide good density or stranding configurations. Ribbon break out assemblies, which are sometimes referred to as Ribbon Interconnect Cables (RIC) or Ruggedized Ribbon assemblies, may be stranded within a copper power conductor stranding arrangement. The ribbon assemblies may be size optimized based on the conductor size. The cables may be characterized by high density with a ribbon format, given low fiber count (generally 12 or 24 fibers) and multiple conductors. Customized cable solutions may be specifically targeted to allow fusion splicing for cable termination, thus increasing installation productivity. Additionally, the fiber units may be routed independently of the copper conductors to allow separation of fiber and copper management.

Conventional Distributed Antenna System (DAS) solutions are provided in 12, 14, 16, 20 American Wire Gauge (AWG) cables. Some applications use 22 or 24 AWG cables but are currently limited to tight buffered fiber constructions. These designs utilize copper conductors, insulated with typical compounds used in the industry, and may be of solid or stranded construction with tinned or bare copper configurations. The cables are generally listed to limited power requirements of the NEC which is characterized to 100 VA maximum power per conductor pair. Limited power cables allow installation by non-certified electricians which may save on labor costs.

Figure 1A:
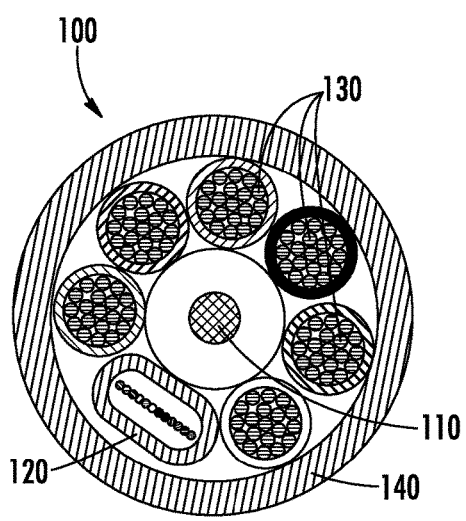
FIGS. 1A and 1B illustrate sectional views of 12 AWG hybrid cables, in accordance with various aspects of the present disclosure.
Figure 1B:
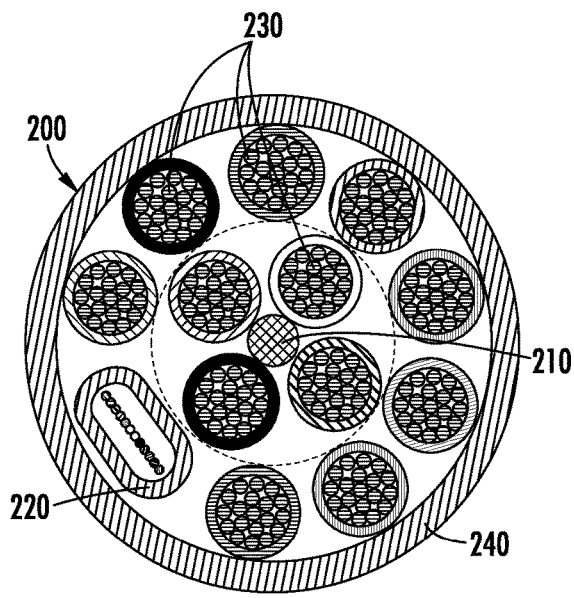

FIGS. 1A and 1B illustrate cable configurations that utilize a ribbon unit, such as a ribbon interconnect (RIC) 12 fiber (120 cable, stranded with 12 AWG power conductors. For example, FIG. 1A illustrates a cable 100 having a central strength element 110 and a ribbon unit 120 stranded with a plurality (e.g., 3 pair) of 12 AWG power conductors 130 around the central strength element 110. An outer jacket 140 may be provided to surround and protect the internal ribbon and conductor members. FIG. 1B illustrates a dual layer cable 200 having a central strength element 210 and an inner layer of power conductors 230 surrounded by an outer layer of power conductors 230 stranded with a ribbon unit 220. An outer jacket 240 may be provided to surround and protect the internal ribbon and conductor members. Cable 200 thus includes 6 pair of 12 AWG conductors. The ribbon unit shown in FIGS. 1A and 1B may be a Corning, Inc. RIC variant having a 2.5 mm×4.5 mm outside diameter (OD) with 2×2450 d aramid yarns. A standard RIC at 2.2 mm×4.2 mm may also be used, for example. The cable OD's are defined using an arbitrary jacket wall thickness. In practice, the wall thickness and finish OD may vary depending on jacket compound, burn rating, mechanical performance and cost. The stranding configuration may be either helical or SZ stranding. For SZ stranding, because the strand direction changes, a defined window for strand lay will exist depending on fiber unit size, fiber type and cable configuration due to directional changes creating a bend in the non-preferential axis. Cables may include 2-6 pairs of conductors, but designs with as many as 12 pair are possible for some conductor sizes.

Figure 2A:
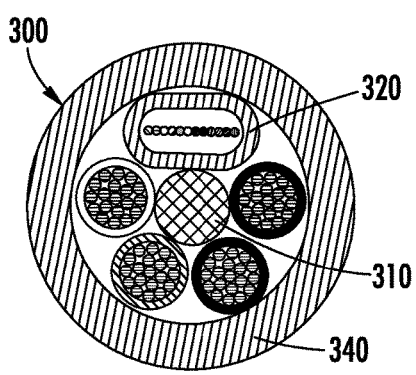
FIGS. 2A and 2B illustrate sectional views of 14 AWG hybrid cables, in accordance with various aspects of the present disclosure.
Figure 2B:
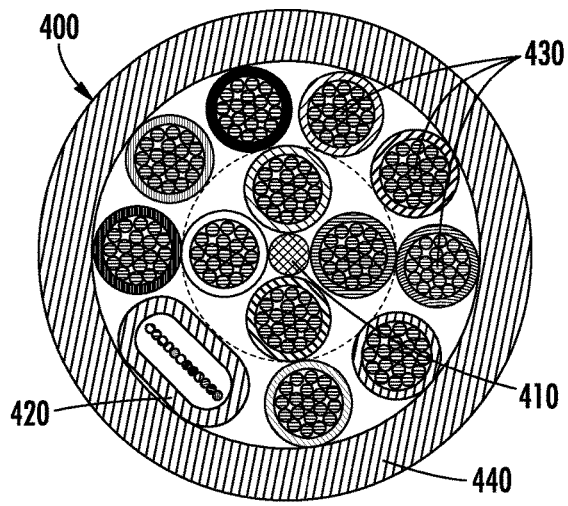

FIGS. 2A and 2B illustrate cable configurations that utilize a ribbon unit, such as a ribbon interconnect (RIC) 12 fiber (120 cable, stranded with 14 AWG power conductors. For example, FIG. 2A illustrates a cable 300 having a central strength element 310 and a ribbon unit 320 stranded with a plurality (e.g., 2 pair) of 14 AWG power conductors 330 around the central strength element 310. FIG. 2B illustrates a dual layer cable 400 having a central strength element 410 and an inner layer of power conductors 430 surrounded by an outer layer of power conductors 430 stranded with a ribbon unit 420. Cable 400 thus includes 6 pair of 14 AWG conductors.

Figure 3:
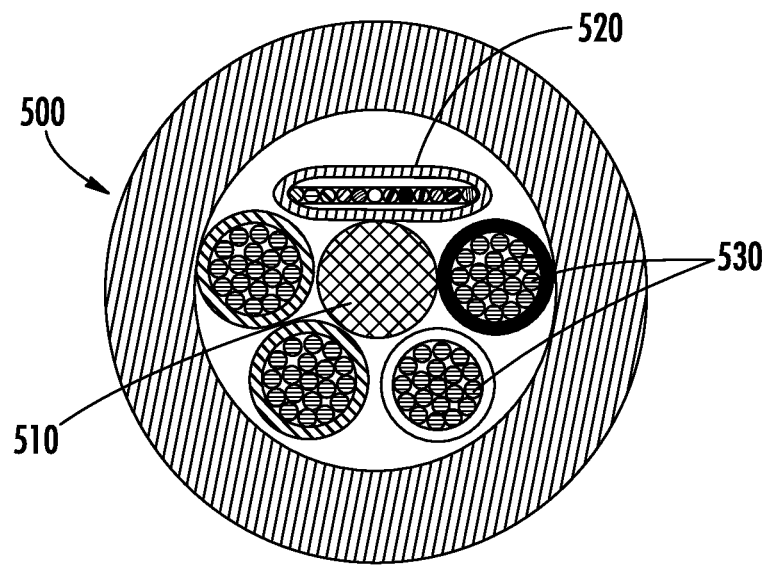
FIG. 3 illustrates a sectional view of a 16 AWG hybrid cable, in accordance with various aspects of the present disclosure.
Figure 4:
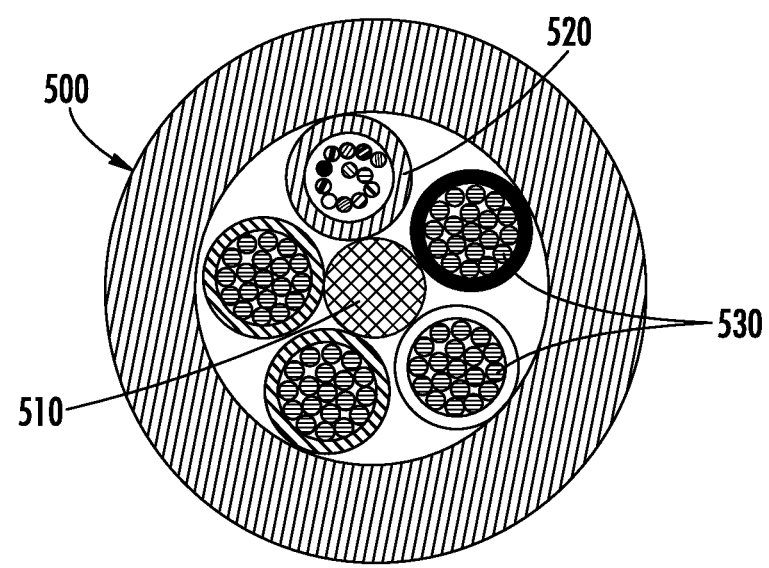
FIG. 4 illustrates a sectional view of 16 AWG hybrid cable having a rollable ribbon unit, in accordance with various aspects of the present disclosure.

FIG. 3 illustrates an example of a 16 AWG cable solution. Due to the increased size constraints imposed by the larger conductors, cable 500 includes a ruggedized ribbon unit 520, which may be a tight buffered fiber unit. The cable 500 has a central strength element 510 with the ruggedized 12f ribbon unit 520 stranded with a plurality (e.g., 2 pair) of 16 AWG power conductors 530 around the central strength element 510. FIG. 4 shows cable 500 in accordance with yet other aspects of the present disclosure, wherein the ribbon unit 520 is a rollable ribbon or similar structure that allows the ribbon unit to be formed into a relatively round profile.

In accordance with yet other aspects of the present invention, the height of the ribbon unit may be formed to be as close to the conductor OD as possible with the conductor unit preferably smaller in height than the OD of a conductor. This allows the unit to be better protected in crush and other mechanical tests. For example, the cable 500 shown in FIG. 3 has 4 conductors. In cables where there may be a limited number of conductors, be it 1 or 2 pair, mechanical performance may be impacted due to the ribbon flexing around a smaller central element. To accommodate, the ribbon matrix flexibility may be maximized even to the point where the matrix may strategically fail in that localized area when mechanical forces are applied while having enough integrity to remain together for fusion splicing at the cable ends. Another option in accordance with aspects of the present disclosure may be to use bend insensitive fibers to account for additional mechanical forces that may exist. The bend insensitive fibers may be applied at the ribbon outside edges up to the entire ribbon depending on required performance needed.

Some solutions require fewer than 12 fibers at a wireless remote. One such example is the Corning ONE® solution. The Corning One solution utilizes 4 fiber count or 6 fiber count ribbons as an optimum solution. In this case, a cable used for connection to a Corning ONE remote may include, for example, 4 conductors and a round unit with a single 4f ribbon.

The construction and arrangements of the hybrid cable, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, ribbon units may include constructions with anywhere from one or more 2,4,6,8,12 fiber ribbons in one or more units. Conductor size options are preferred to be anywhere from 10 AWG to 20 AWG. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive and innovative technology.

What is claimed is:

1. A hybrid cable, comprising:
a jacket defining a cavity therein;
a central strength member;
a ribbon unit having a plurality of optical fibers;
a conductor cable, wherein the conductor cable and the ribbon unit are stranded around the central strength member to extend through the cavity of the jacket; and
an inner layer of conductor cables, wherein the ribbon unit and the conductor cable are stranded to surround the inner layer of conductor cables such that the inner layer of conductor cables is located between the ribbon unit and the central strength member.

2. The hybrid cable of claim 1, wherein the ribbon unit is a ribbon interconnect cable comprising twelve optical fibers.

3. The hybrid cable of claim 2, wherein the conductor cable is a 12, 14, 16, or 20 American Wire Gauge (AWG) cable.

4. The hybrid cable of claim 1, wherein the conductor cable and the ribbon unit are stranded in an SZ stranding configuration.

5. The hybrid cable of claim 1, wherein the conductor cable and the ribbon unit are stranded in a helical stranding configuration.

6. The hybrid cable of claim 1, wherein the conductor cable is a 16 AWG cable and the ribbon unit is a ruggedized ribbon unit.

7. The hybrid cable of claim 6, wherein the ruggedized ribbon unit is a tight buffered fiber unit.

8. The hybrid cable of claim 7, wherein the ruggedized ribbon unit comprises a rollable ribbon structure that allows the ribbon unit to be formed into a relatively round profile.

9. The hybrid cable of claim 1, wherein at least one of the plurality of optical fibers is a bend insensitive fiber.

10. The hybrid cable of claim 1, further comprising a plurality of conductor cables, wherein the ribbon unit is a round unit and the plurality of optical fibers comprise a four fiber ribbon or a six fiber ribbon configuration.

11. The hybrid cable of claim 1, wherein the ribbon unit has a height and the conductor cable has an outer diameter, and wherein the height of the ribbon unit is less than the outer diameter of the conductor cable.

12. The hybrid cable of claim 1, wherein the central strength member has a radially outward facing surface and the ribbon unit has a radially inwardly facing surface that faces towards the radially outward facing surface of the central strength member.

13. The hybrid cable of claim 12, wherein the radially inwardly facing surface of the ribbon unit contacts the radially outward facing surface of the central strength member.

* * * * *